United States Patent [19]

Turner

[11] Patent Number: 5,475,680
[45] Date of Patent: Dec. 12, 1995

[54] ASYNCHRONOUS TIME DIVISION MULTIPLEX SWITCHING SYSTEM

[75] Inventor: Alec J. Turner, Uxbridge, England

[73] Assignee: GPT Limited, United Kingdom

[21] Appl. No.: 115,904

[22] Filed: Sep. 1, 1993

Related U.S. Application Data

[63] Continuation of Ser. No. 689,813, filed as PCT/GB90/01369, Sep. 5, 1990, abandoned.

[30] Foreign Application Priority Data

Sep. 15, 1989 [GB] United Kingdom .................. 8920980

[51] Int. Cl.$^6$ ................................................. H04L 12/56
[52] U.S. Cl. ............................................ 370/60; 370/94.1
[58] Field of Search ................................. 370/58.1, 58.2, 370/58.3, 60, 60.1, 61, 94.1, 94.2

[56] References Cited

U.S. PATENT DOCUMENTS

| 4,499,576 | 2/1985 | Fraser | 370/60 |
|---|---|---|---|
| 4,603,416 | 7/1986 | Servel et al. | 370/60 |
| 4,748,618 | 5/1988 | Brown et al. | 370/94.1 |
| 4,849,968 | 7/1989 | Turner | 370/94.1 |
| 4,884,264 | 11/1989 | Servel et al. | 370/58.1 |
| 4,914,650 | 4/1990 | Sriram | 370/94.1 |
| 4,914,653 | 4/1990 | Bishop et al. | 370/94.1 |
| 4,918,687 | 4/1990 | Bustini et al. | 370/60.1 |
| 4,949,338 | 8/1990 | Albal et al. | 370/85.6 |
| 5,033,045 | 7/1991 | Ramel et al. | 370/94.1 |
| 5,048,013 | 9/1991 | Eng et al. | 370/58.1 |
| 5,179,557 | 1/1993 | Kudo | 370/94.1 |
| 5,233,606 | 8/1993 | Pashan et al. | 370/94.1 |

FOREIGN PATENT DOCUMENTS

| 0299473 | 1/1989 | European Pat. Off. . |
|---|---|---|
| 0300942 | 1/1989 | European Pat. Off. . |
| WO8602511 | 4/1986 | WIPO . |

OTHER PUBLICATIONS

Martin H. Weik, Communications Standard Dictionary, 1983, pp. 359, 497 & 745.

Primary Examiner—Alpus Hsu
Attorney, Agent, or Firm—Kirschstein et al.

[57] ABSTRACT

An ATDM switching system comprises a serial to parallel converter arranged to receive incoming packets of data (which include their own routing information) from several input ports in serial form and deliver them, in parallel format, to a Random Access Memory (RAM) in such a way that the packets form queues within the memory, one for each output port. Packets are then transferred in parallel format, one from each queue in turn, to a parallel to serial converter which delivers them to their respective output ports in serial format. The arrangement is such that when the memory becomes full the system can accommodate incoming packets by overwriting data in the longest queue, a technique that can significantly reduce the total number of packets lost during long term operation.

7 Claims, 10 Drawing Sheets

Fig.1A

Results from a simulation of 1E6 packets of pseudo-random traffic in a 16x16 switch
(Total queue depth = 256)

Algorithm 1 (sacrifice incoming data), or 2 (sacrifice data in the longest queue) : 1
Enter total queue depth : 256
Enter number of ports : 16
Enter traffic density ratios ...
    Port 0: 16
    Port 1: 17
    Port 2: 18
    Port 3: 19
    Port 4: 20
    Port 5: 21
    Port 6: 22
    Port 7: 23
    Port 8: 24
    Port 9: 25
    Port 10: 26
    Port 11: 27
    Port 12: 28
    Port 13: 29
    Port 14: 30
    Port 15: 31
Enter total occupancy (%) : 100
Enter number of packets to be simulated : 1000000

| | | | |
|---|---|---|---|
| Port 0: | IN = 42506, | OUT = 32177, | LOST = 10329 (24.30%) |
| Port 1: | IN = 45256, | OUT = 34275, | LOST = 10981 (24.26%) |
| Port 2: | IN = 47934, | OUT = 36307, | LOST = 11627 (24.26%) |
| Port 3: | IN = 50609, | OUT = 38511, | LOST = 12098 (24.90%) |
| Port 4: | IN = 53077, | OUT = 40233, | LOST = 12844 (24.20%) |
| Port 5: | IN = 56029, | OUT = 42450, | LOST = 13579 (24.24%) |
| Port 6: | IN = 58224, | OUT = 44228, | LOST = 13996 (24.04%) |
| Port 7: | IN = 60918, | OUT = 46369, | LOST = 14549 (23.88%) |
| Port 8: | IN = 64386, | OUT = 48873, | LOST = 15513 (24.09%) |
| Port 9: | IN = 66068, | OUT = 50199, | LOST = 15869 (24.02%) |
| Port 10: | IN = 69169, | OUT = 52413, | LOST = 16756 (24.22%) |
| Port 11: | IN = 71625, | OUT = 54383, | LOST = 17241 (24.07%) |
| Port 12: | IN = 74390, | OUT = 56278, | LOST = 18112 (24.35%) |
| Port 13: | IN = 77358, | OUT = 58510, | LOST = 18848 (24.36%) |
| Port 14: | IN = 79725, | OUT = 60482, | LOST = 19243 (24.14%) |
| Port 15: | IN = 82726, | OUT = 62673, | LOST = 20053 (24.24%) |
| Total: | IN = 1000000, | OUT = 758362, | LOST = 241638 (24.16%) |

Maximum total queue depth = 256
Maximum single queue depth = 16.00

*Fig. 2*

Algorithm 1 (sacrifice incoming data), or 2 (sacrifice data in the longest queue) : 2
Enter total queue depth : 256
Enter number of ports : 16
Enter traffic density ratios ...
    Port 0: 16
    Port 1: 17
    Port 2: 18
    Port 3: 19
    Port 4: 20
    Port 5: 21
    Port 6: 22
    Port 7: 23
    Port 8: 24
    Port 9: 25
    Port 10: 26
    Port 11: 27
    Port 12: 28
    Port 13: 29
    Port 14: 20
    Port 15: 31
Enter total occupancy (%) : 100
Enter number of packets to be simulated : 1000000

| | | | |
|---|---|---|---|
| Port 0: | IN = 42506, | OUT = 42506, | LOST = 0 (0.00%) |
| Port 1: | IN = 45256, | OUT = 45256, | LOST = 0 (0.00%) |
| Port 2: | IN = 47934, | OUT = 47934, | LOST = 0 (0.00%) |
| Port 3: | IN = 50609, | OUT = 50609, | LOST = 0 (0.00%) |
| Port 4: | IN = 53077, | OUT = 53077, | LOST = 0 (0.00%) |
| Port 5: | IN = 56029, | OUT = 56017, | LOST = 12 (0.02%) |
| Port 6: | IN = 58224, | OUT = 58127, | LOST = 97 (0.17%) |
| Port 7: | IN = 60918, | OUT = 60634, | LOST = 284 (0.47%) |
| Port 8: | IN = 64386, | OUT = 62261, | LOST = 2125 (3.30%) |
| Port 9: | IN = 66068, | OUT = 62401, | LOST = 3667 (5.55%) |
| Port 10: | IN = 69169, | OUT = 62521, | LOST = 6648 (9.61%) |
| Port 11: | IN = 71625, | OUT = 62531, | LOST = 9094 (12.70%) |
| Port 12: | IN = 74390, | OUT = 62532, | LOST = 11858 (15.94%) |
| Port 13: | IN = 77358, | OUT = 62531, | LOST = 14827 (19.17%) |
| Port 14: | IN = 79725, | OUT = 62536, | LOST = 17189 (21.56%) |
| Port 15: | IN = 82726, | OUT = 62534, | LOST = 20192 (24.41%) |
| Total: | IN = 1000000, | OUT = 914007, | LOST = 85993 (8.60%) |

Maximum total queue depth = 256
Maximum single queue depth = 16.00

*Fig. 2A*

ASYNCHRONOUS TIME DIVISION MULTIPLEX SWITCHING SYSTEM

This application is a continuation of application Ser. No. 07/689,813 filed as PCT/GB90/01369, Sep. 5, 1990, now abandoned.

BACKGROUND OF THE INVENTION

1. Field of the Invention

The invention relates to an asynchronous time division multiplex (ATDM) switching system.

2. Description of Related Art

The function of an ATDM switch is to route packets of information, entering the switch via a number of input ports, through to output ports specified by header information contained within each packet and, in addition, to provide a queuing facility so that the switch can cope when packets on more than one input are destined for the same output. A simple method of implementing this function is to use a RAM, divided up into separate, fixed length queues, one for each output, together with some control logic that uses an incoming packet's header field to determine into which queue that packet should be stored. The output side of the switch simply takes packets from the tail end of each queue in turn and delivers them to the associated output port. The problem with this design is that it limits each queue to a fixed amount of space within the RAM, which under non-uniform traffic conditions, will prove inefficient as some queues fill up while others still have free space available. A better method is to construct the queues as chains of linked RAM locations which can expand into whatever areas of memory are still free. Here, locations in the same queue do not necessarily occupy contiguous locations in the RAM and so the system must store, for each location containing a packet—the address of the next location in that packer's queue, for each vacant location—the address of the next vacant location (these form their own queue, commonly known as the 'Free List') and for each queue—the address of the locations at the head and tail ends of that queue together with a count of the number of elements it contains. Using this arrangement the memory allocated to a given queue is now proportional to the amount of traffic that is destined for the output port associated with that queue. Unfortunately this design also presents a problem, namely that channels having relatively high traffic densities can fill the memory to the point where those with less traffic are left with little or no queue space at all. One solution would be to reserve a minimum amount of memory for each queue but this suffers from the same drawback as the original design in that there would be times when data was being lost from busier channels whilst space reserved in other parts of the RAM was empty and, therefore, theoretically available for use. What is needed is a design that gives channels with less traffic priority access to the memory if and when it becomes full.

SUMMARY OF THE INVENTION

According to the invention there is provided an asynchronous time division multiplex switching system comprising a serial to parallel converter arranged to receive incoming packets of data which include routing information in serial form and convert them into parallel form, a memory in which each incoming packet of data is entered in an addressed location thereof, a processor to arrange said incoming packets of data in queues, one for each output port, and parallel to serial convertor arranged to receive packets of data from said queues of data in parallel form and convert them into serial form for delivery to output ports corresponding to each queue said processor being arranged to maintain a record of number of packets in each of said queues so that when the memory is full, a packet at the head of the longest queue is discarded to make room for an incoming packet of data.

Further according to the invention there is provided a method of routing data in an asynchronous time division multiplex switching system, which comprises converting incoming packets of data which include routing information from serial form to parallel form, entering each packet of incoming data in an addressed location of a memory, arranging said incoming packets of data in queues, one for each output port, converting said packets of data from parallel form to serial form for delivery to output ports corresponding to each queue, maintaining a record of number of packets of data in each of said queues and discarding a packet of data at the head of the longest queue to make room for an incoming data, when the memory is full.

Preferably the serial to parallel converter is split into two halves and each packet of data is split into two halves and read into a respective half of the serial to parallel converter, and the memory is split into two halves, each of which is arranged to be accessed independently and is arranged to store the respective half of the packet of data from the respective half of the serial to parallel converter. The parallel to serial converter is also split into two halves, each arranged to receive the respective half of the packet of data from the memory for delivery to an output port. The system embodying the present invention may be embodied in an integrated silicon chip.

BRIEF DESCRIPTION OF THE DRAWINGS

The invention will now be further described by way of example with reference to the accompanying drawings in which:

FIG. 1 and 1A show a 'Linked List' structure implementing four first in/first out queues during a sequence of packet arrivals and departures;

FIG. 2, 2A and 3 show results from simulations of the ATDM switching system which illustrate how a discarded packet at the head of the longest queue in order to accommodate an incoming packet can significantly reduce packet losses;

DETAILED DESCRIPTION OF THE PREFERRED EMBODIMENTS

Figure 1:
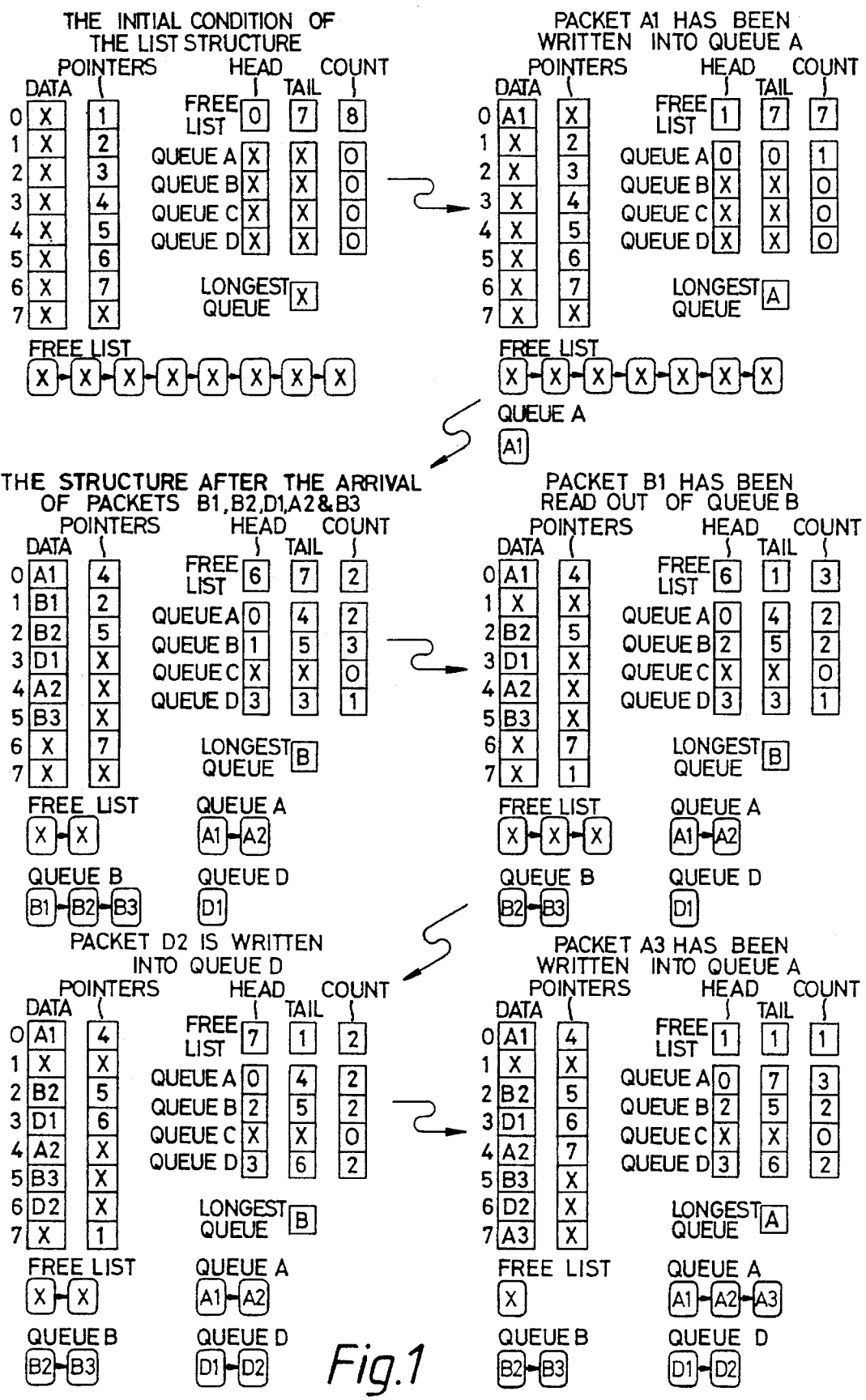
Figure 1A:
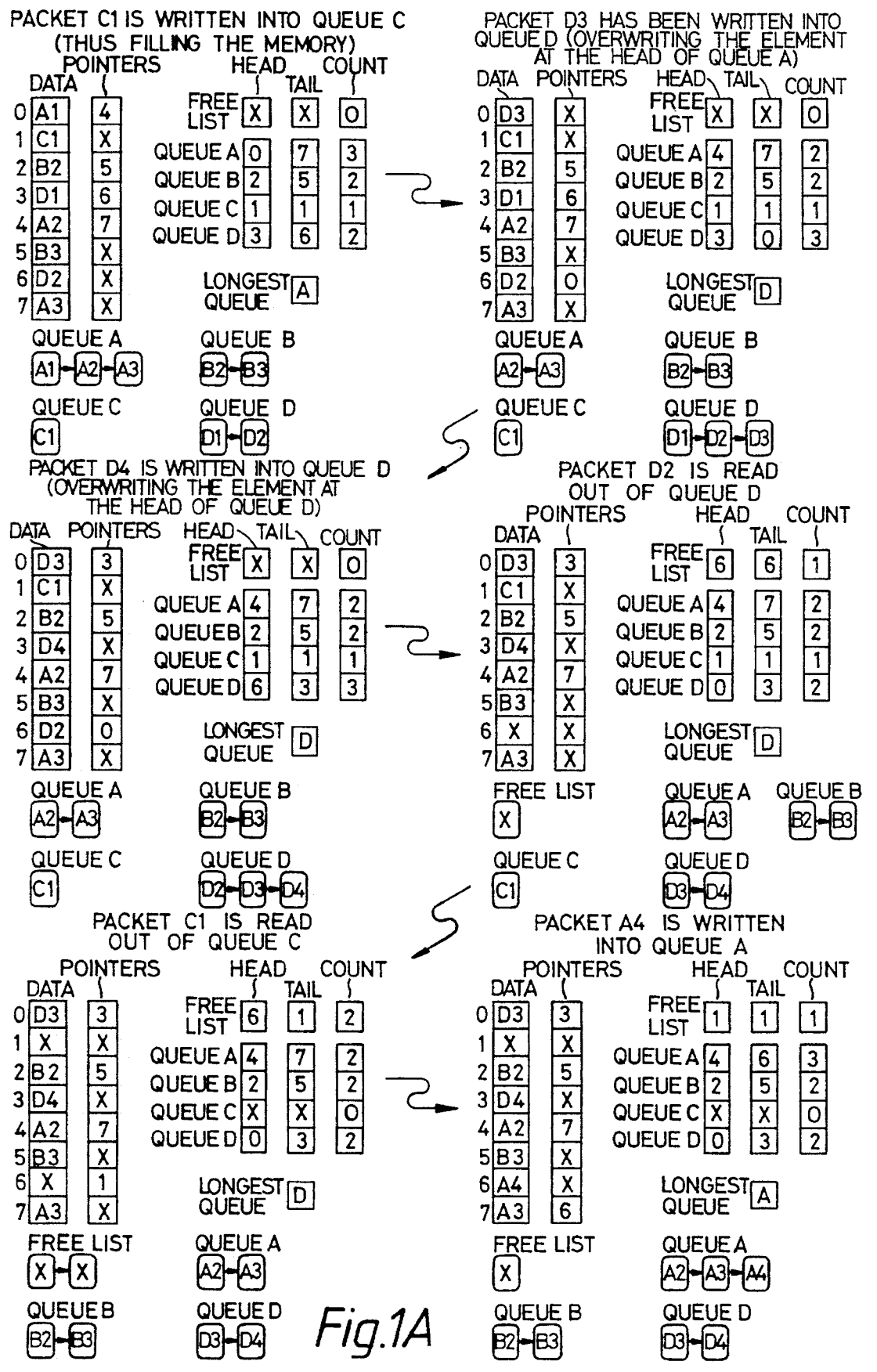

FIG. 1 and 1A illustrate the changing structure of this 'linked list' queuing system during a typical sequence of packet arrivals and departures. Four separate queues, labeled A, B, C & D are implemented. The rectangular boxes represent the following physical areas of storage: "Data" is an 8 RAM (Random Access Memory) where each word can hold one packet of information, Pointers is an 8 word RAM where each word holds a 3 bit value that refers to the addresses alongside the 'Data' RAM, 'Head' is a file of 5×3 bit registers that holds the RAM address of the element at the head of each queue (including the 'Free List'), 'Tail' is a file of 5×3 bit registers that holds the RAM address of the element at the tail of each queue, 'Count' is a file of 5×4 counters that holds the number of elements in each queue and 'Longest Queue' is a 2 bit register that indicates which of the four data queues is currently the longest. In addition, each stage of the diagram also includes a pictorial representation of the queues in existence at that point in time. The symbol 'X' is used wherever the actual contents of a RAM location or register is irrelevant.

Figure 3:
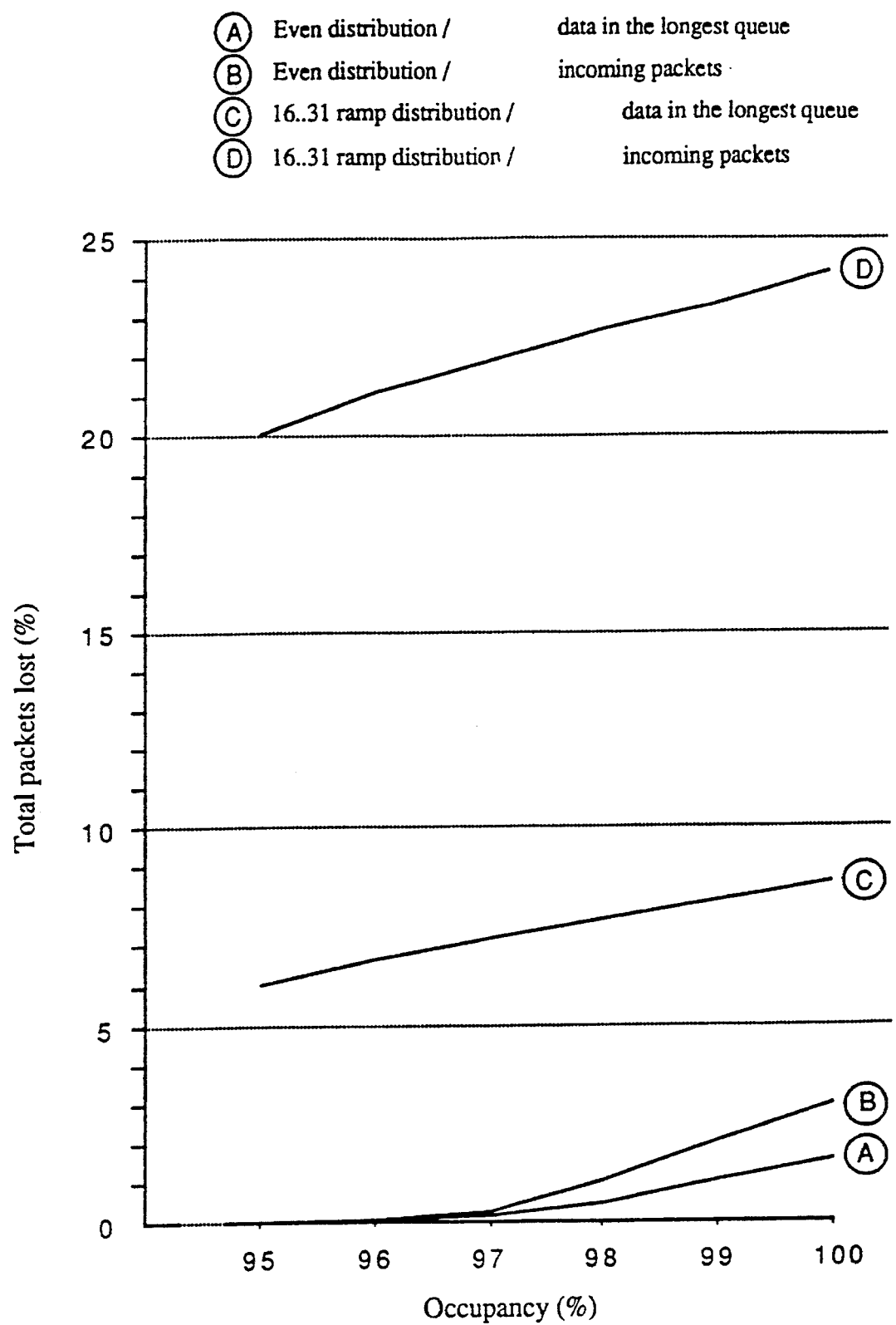

FIGS. 2, 2A show the results obtained by a Pascal simulation of the switching system described here. Two versions of the algorithm used to handle the queuing of packets were tested. In algorithm 1, when the memory is full, incoming packets are simply discarded, whilst with algorithm 2 they are accommodated by sacrificing the element at the head of the longest queue. The distribution of traffic across the queues is given by traffic density ratios which specify the relative amount of traffic going to each output. For example, in the case of FIG. 2A, for every 16 packets that are destined for output port 0, there will be 17 for port 1, 18 for port 2 and so on up to port 15 which will receive 31. The 'total occupancy' value specifies what percentage of the input packets are valid, leaving the rest to be marked in their header field as invalid (i.e. empty). From FIG. 2A it can be seen that, whilst losses from the busiest queue (port 15) are largely unaffected by the choice of algorithm, those from queues with less traffic are drastically reduced to the extent that the overall loss of data is cut by over 64%. FIG. 3 shows that this improvement applies to evenly distributed traffic as well and that it is consistent over a whole range of levels of occupancy. Whilst it is to be expected that the emptier queues lose less data (after all, only the longer and hence busier queues get overwritten), it is not immediately apparent why the busier queues are not affected adversely. The explanation relies on the fact that, during any given period when a packet arrives, the memory will only fill up if another packet does not leave, a situation which only arises when the queue for the currently selected output port is empty. The queues most likely to become empty will be the shortest ones and, by ensuring that these never lose data, the risk of them emptying, and consequently, that of the memory filling, is reduced. As long as the memory does not fill up, no packets are lost from any queue, and so, in the long term, sacrificing data on busier channels is of benefit, not just to traffic in the smaller queues, but to the whole system.

Figure 4:
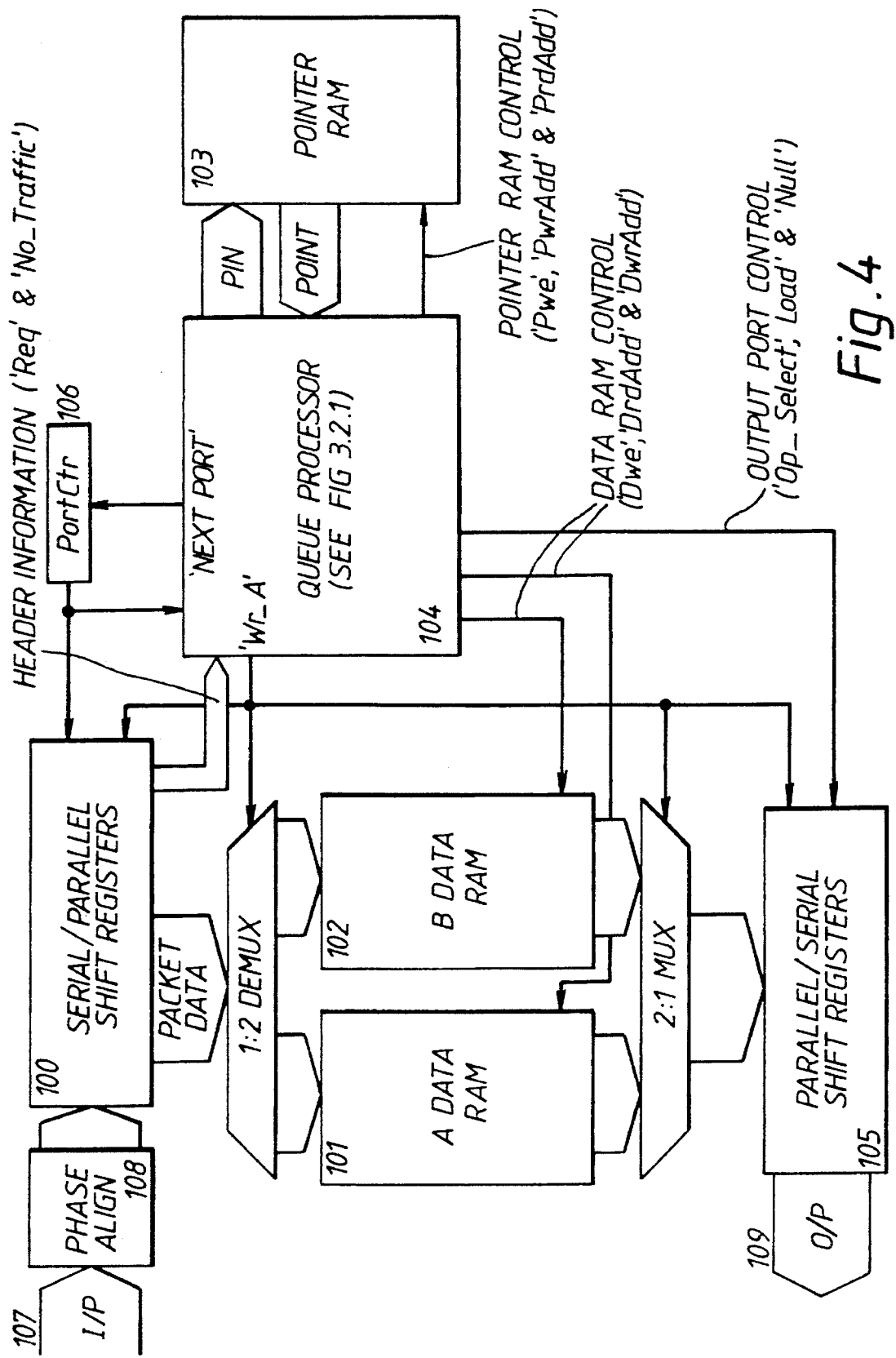
FIG. 4 illustrates a ATDM switching system.

FIG. 4 illustrates the top level architecture of the ATDM switching system. The main components are a 16 input×160 bit serial to parallel converter 100, two blocks of 256×160 bit Random Access Memory (RAM) 101 & 102 that are used to store separate halves of data packets in First In/First Out queues associated with each of the switch's output lines, a 256×8 bit RAM 103 that holds, for each corresponding location in the 'data' RAMs, the address of the next location in the associated queue, a queue processor 104, a 16 output× 160 bit parallel to serial converter 105 and a 4 bit counter 106 that is used to cycle through the input ports.

Data for the switch arrives on the 16 serial input lines 107 at a rate of 160 Mbit/s in the form of packets of 320 bits each. At the front end of each packet is a header block containing 1 bit to indicate whether the packet is valid or should be ignored and a further 4 bits which indicate to which of the 16 switch output lines the packet should be routed. These packets are aligned by a phase aligner 108 and then pass into the serial to parallel converter 100 which consists of 32×160 bit shift registers, 2 for each input. The first halves of each packet (referred to as the 'A' halves) are loaded, simultaneously for each of the 16 input lines, into the first 16 shift registers so that after 960 ns these registers are full and the second halves of the packets (the 'B' halves are about to enter the input side of the serial to parallel converter. These now load into the second 16 shift registers and during the 960 ns it takes to perform this the 16 'A' halves can be transferred, one at a time as they are selected by counter 106, in parallel, into the 'A data' RAM 101. Similarly, when the first halves of the next 16 packets are loading into their shift registers, the 'B' halves can be transferred into the 'B data' RAM 102. As each packet is selected for transfer into the appropriate block of RAM, the queue processor 104 uses the header information associated with that packet to determine the actual RAM address into which it will be written. The operation of the queue processor will be described in detail in the next section.

Figure 5:
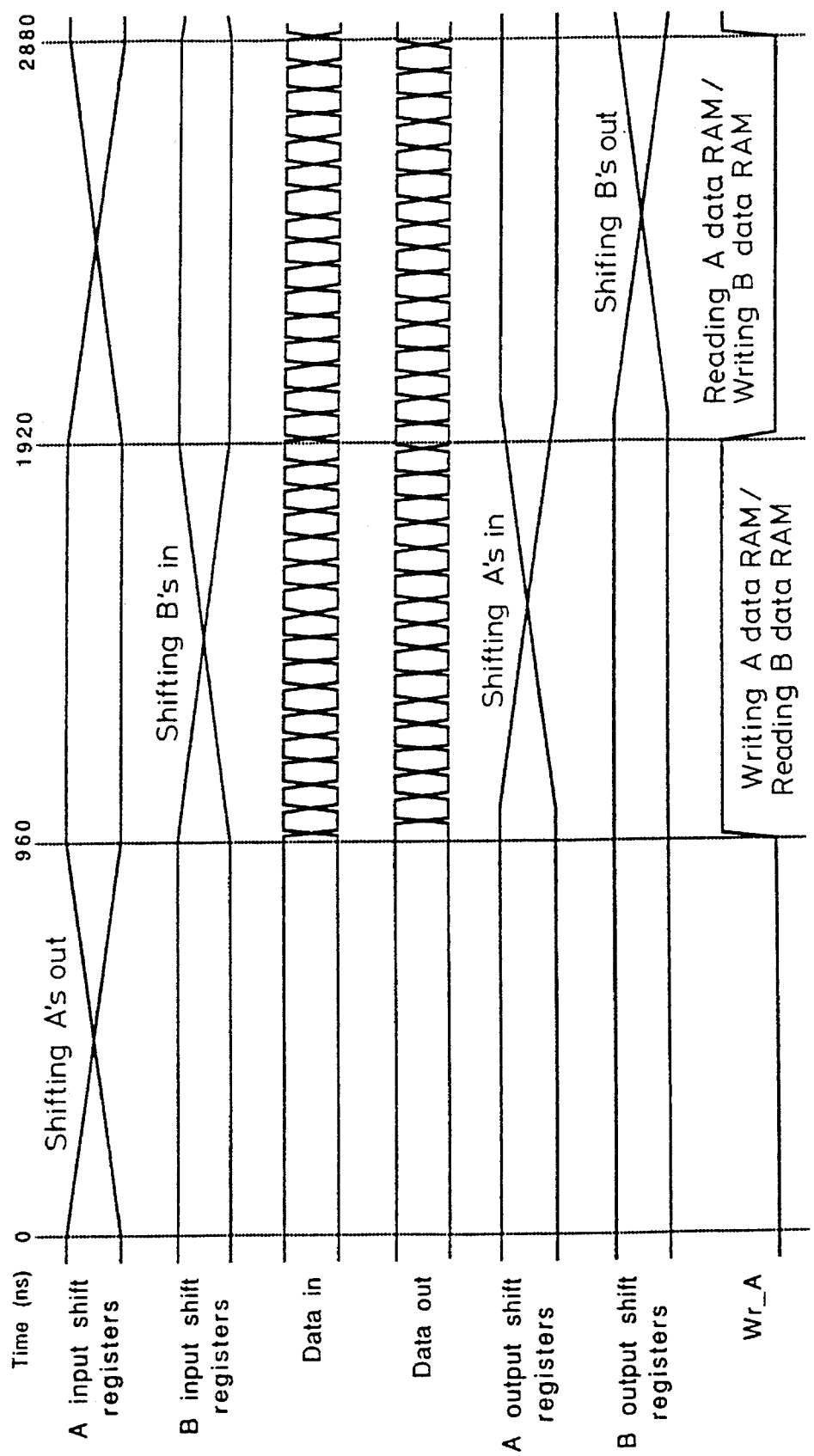
FIG. 5 shows the timing of packet arrivals and departures in the system of FIG. 4.

The sequence of operations for moving data from the RAMs to the output ports is similar to the above but in reverse. During the 16×60 ns periods in which the processor calculates 'B' RAM write addresses for each of the incoming 'B' packet halves it also produces 'A' RAM read addresses by selecting each output queue in turn (using the vale in counter 106 and choosing the tail element of that queue. Similarly, produces 'B' RAM read addresses during those periods when it is writing the 'A' packet halves into the 'A' RAM. Data is transferred from these read addresses to the parallel to serial converter 105 as follows. While the 'B' packet halves are being moved, one at a time, in parallel, frown the 'B' RAM to the second set of 16 shift registers within the parallel to serial converter, the 'A' halves (which have already been transferred) are being shifted, simultaneously, from each of the first set of 16 shift registers onto the 16 serial output lines 109 and, similarly, while the next 16 'A' halves are being transferred from the 'A' RAM, the 'B' halves are being shifted out. If there is no data currently queued for a given output port then no transfer from the RAM takes place, the shift register that would have received data is loaded with a null packet and the header field is modified to identify it as being invalid. FIG. 5 shows the timing and synchronization of the data transfers described above.

This level of the switch architecture is described in more detail in GB Patent Application No. 8823493.5, published as GB 2,223,648.

The Queue Processor

Figure 6A:
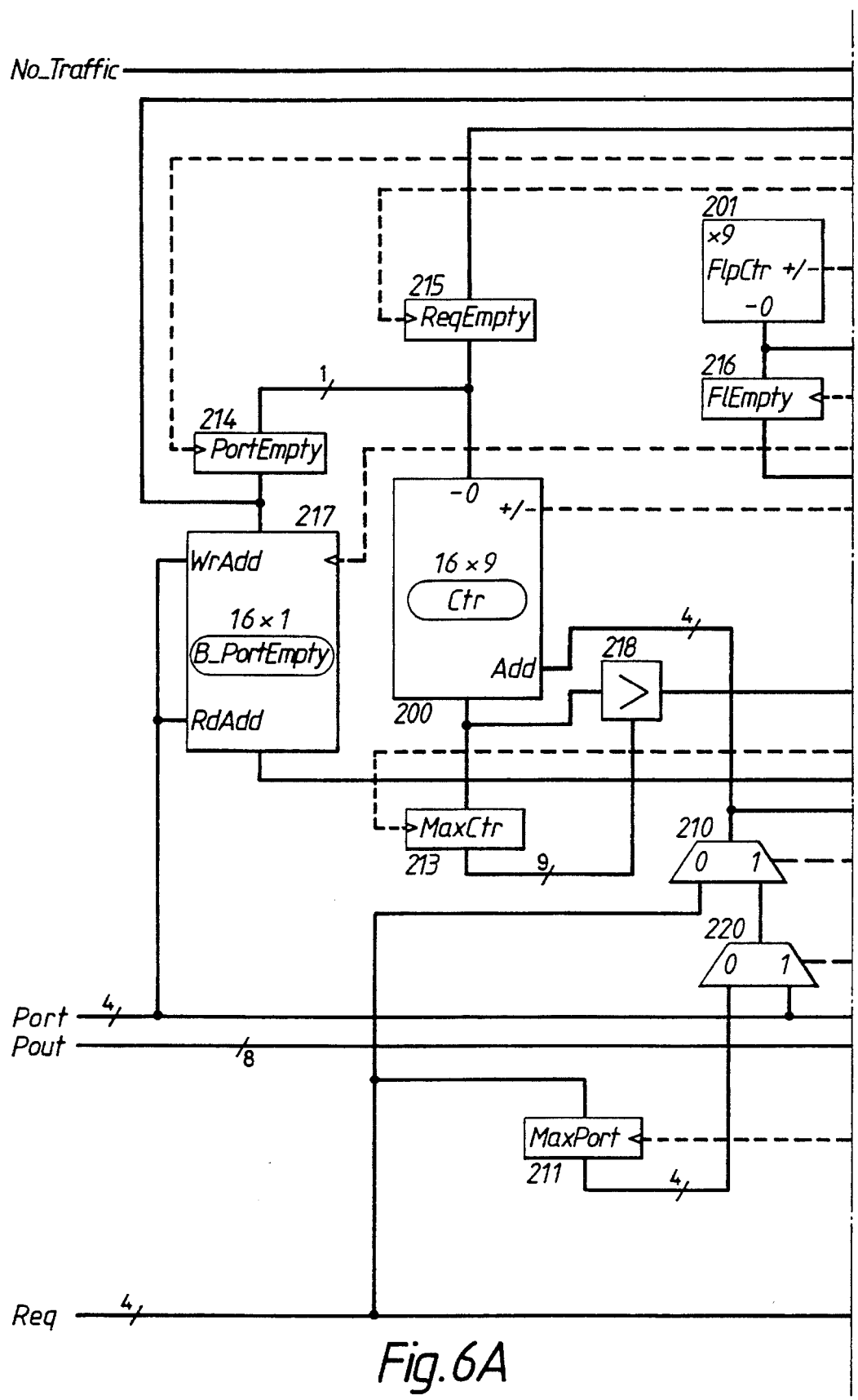
FIGS. 6A, 6B, 6C illustrate an ATDM switching system including a Queue Processor embodying the invention.
Figure 6B:
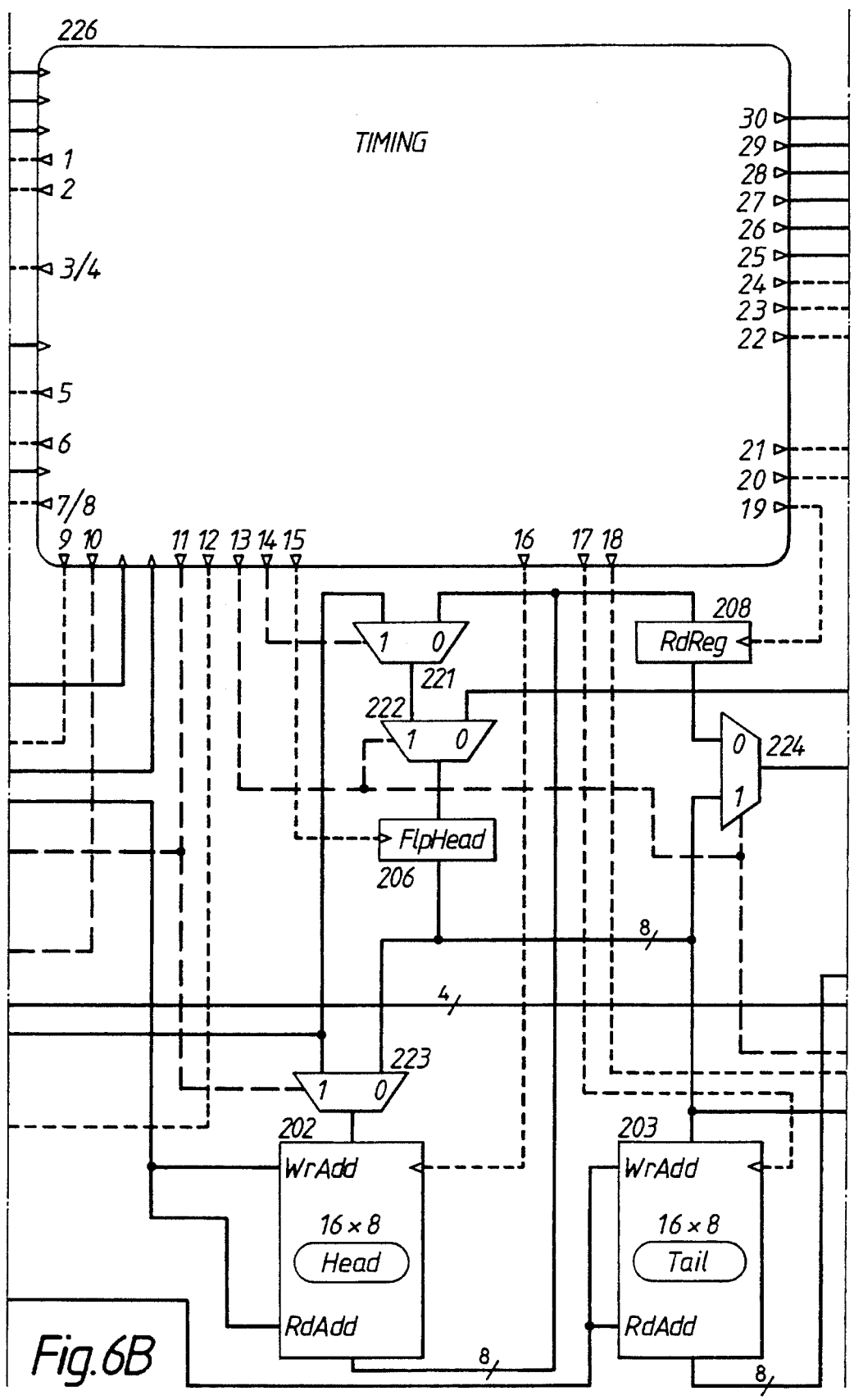
Figure 6C:
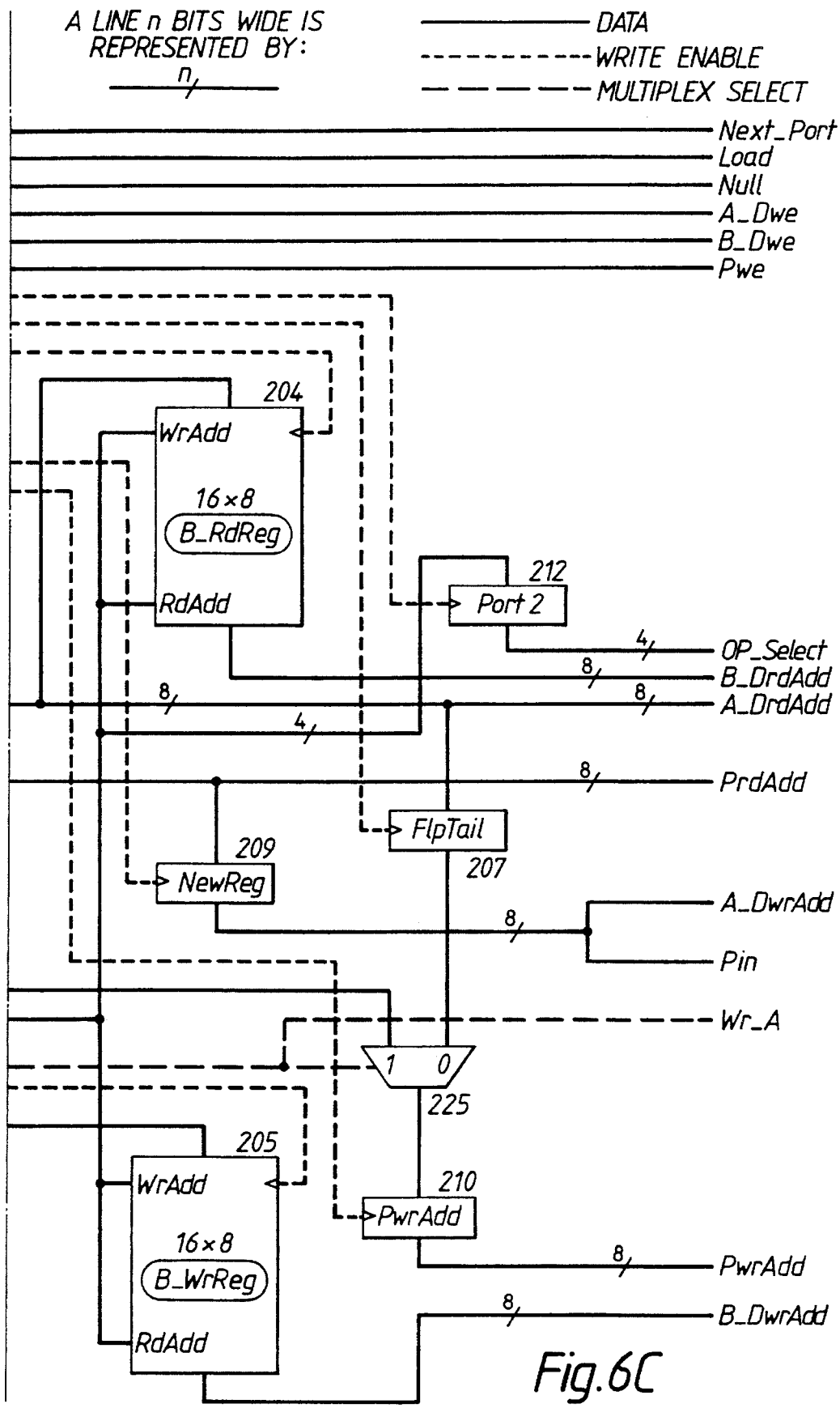

The queue processor illustrated in FIGS. 6A, 6B, 6C includes the following components:

A block of 16×9 bit up/down counters 200 (used to store the number of elements in each queue) which produces, as an output, the value of one counter (selected by a 4 bit input) together with a single bit to indicate whether that value is zero; a single 9 bit up/down counter 201 that holds the number of elements in the 'Free List' and which produces a single bit to indicate when that value is zero; four register files of 16×8 bit words 202–205 that are used to hold, respectively, the RAM addresses of the head and tail elements in each queue and the RAM read and write addresses used for each 'A; packet half (so they can be re-used on the 'B' packet half); five 8 bit registers 206–210 used to hold, respectively, the addresses of the head and tail elements of the 'Free List' the 'A data' RAM read and write addresses and the 'Pointer' RAM write address; two 4 bit registers 211 & 212 that hold the number of the output port whose queue is currently the longest and the number of the output port currently being loaded from the RAM; one 9 bit register 213 that holds the number of elements in the longest queue; three single bit latches 214–216 that hold, respectively, a flag which is set if there is no queue for the current output port, a flag which is set if there is no queue for the output port requested by the current incoming packet and a flag which is set when the memory is full; a file of 16×1 bit flags 217, one for each output port, which are set when those ports don't have any queued packets; a 9 bit comparator 218 that is used to determine when one of the values in the block of counters 200 exceeds the value in the 9 bit register 213; two 2 input×4 bit multiplexers 219 & 220 and five 2 input×8 bit multiplexers 221–225; and finally a block of combinational logic 226 that determines if and when to transfer data between the aforementioned components. A summary of the inputs, outputs and components of FIGS. 6A, 6B, 6C is given in Data sheet A.

As described in the previous section, packets of data are selected, one at a time from shift registers within the serial to parallel converter 100, for transfer to one of the two blocks of RAM 101 & 102. As each packet is selected, header information relating to that packet becomes available to the queue processor 104. This information is in the form of a single bit (marked 'No Traffic' in FIG. 6A) which, when high, indicates that the packet is invalid and should be ignored, and a 4 bit word (marked 'Req') which specifies the output port (and hence the queue) to which that packet should be delivered. The only other inputs to the queue processor are the 4 bit output of counter 106 ('Port') that specifies which output port is currently taking data from the RAM and the 8 bit output ('Pout') of the 'Pointer' RAM 103. A new packet header arrives at the processor every 60 ns during which time it must generate one of two possible pairs of addresses. These are either an 'A data' RAM write address and a 'B data' RAM read address or an 'A data' RAM read address and a 'B data' RAM write address. The decision concerning which pair to generate is based on a clock line ('Wr A') that changes state every 960 ns and which is synchronized with the serial to parallel and parallel to serial converters 100 & 105 so that the reading and writing of 'A' and 'B' packet halves proceeds as described in the previous section (see FIG. 5). The calculation of one address pair is split into ten 6 ns steps where each step is carried out when the corresponding output from a 10 bit 'walking one' sequencer (held within the 'TIMING' block 226 is high. Appendixes A-1 and A-2 give an algorithmic description of the steps carried out in each of the two phases of 'Wr A'. What follows is a detailed description of how the design shown in FIGS. 6A, 6B, 6C carries out these steps in a number of specific situations.

The outputs from the 'TIMING' block 226, numbered from 1 to 30 in FIG. 6B and hereinafter referred to as T1 to (see Data sheet B) are generated from the 'No Traffic' bit of the header field, the output of latches 214, 215 & 216 & comparator 218 and the ten bits of the 'walking one' sequencer, using the boolean equation given in data sheet B.

Case 1: Generating an 'A data' RAM write address and a 'B data' RAM read address with free space available in the memory and a valid incoming packet.

The output front the 9 bit counter 201 will be low because at least one free location remains on the 'Free List', the input line 'No Traffic' (front the packet header) will be low because the incoming packet currently being dealt with is valid 'Port', which is the output from the counter 106, will hold the number of the output port currently awaiting a 'B' packet half and the value 'Req' (from the packet header) will contain the number of the output port, and hence the queue, into which the incoming 'A' packet half wishes to be delivered. The 'walking one' sequencer within the 'TIM-ING' block 226 will start off with a value of 1000000000 and hence initiate step 1. A read operation commences on the register file 204 in order to obtain the RAM address used in the previous phase of 'Wr A' when reading out the 'A' half of the packet to the output port that is now awaiting the corresponding 'B' half. The output of this register file provides the read address for the 'B data' RAM 102 and, once stable, will cause the aforementioned 'B' packet half to transfer to the input of the parallel to serial converter 105. The 'walking one' sequencer now changes to give a value of 0100000000 thus initiating step 2. This is a null step which is used to allow changing output values to stabilize. In step 3 the multiplexer 224 is set by T13 to select the output of register 206 (which holds the RAM address of the head of the 'Free List') as the read address for the 'pointer' RAM. This action causes the address of the location next in the 'Free List' after it's head to become available on the input line 'Pout'. T18 goes high which causes the value in register 206 to be written into the register file 205 at the location selected by 'Port'. This is done because it is the write address for the 'A data' RAM and must be preserved so it can be re-used when dealing with the 'B' half of the incoming packet in the next phase of 'Wr A'. Multiplexer 219 is set by T11 so that the value 'Req' is used to select a counter from the block 200. The particular counter selected holds the number of elements in the queue for the output port requested by the incoming 'A; packet half and the flag indicating whether or not this value is zero is transferred to latch 215 as T2 is driven high. T5 is driven high which causes the output of counter 201 (which will be zero because there are still elements on the 'Free List') to be loaded into latch 216. T21 is driven high and the value in register 206 is loaded into register 209 which, in turn, provides the write address for the 'A data' RAM 101 and the input to the 'Pointer' RAM 103. T20 is driven high and multiplexer 225 is set by T13 so that the output of register file 203 (which is the RAM address of the element at the tail end of the queue for the output port requested by the incoming packet) is loaded into register 210 which in turn drives the write address for the 'Pointer' RAM 103. In step 4 the write enable line (T27) of the 'A data' RAM 101 is driven high causing the incoming 'A' packet half to be written in at the address held by register 209 thus filling the location at the head of the 'Free List'. T4 is sent high which causes the counter 201 (the number of free RAM locations) to decrement. In step 5 multiplexer 219 is set by T11 so that the value 'Req' is used as the write address for register file 202. This selects the register containing the address of the element at the head of the queue requested by the incoming packet. Multiplexer 223 is set by T11 so that the value register 206 (the current 'A data' RAM write address) can be written into register file 202. If latch 215 is high, which implies that no queue currently exists for the output port requested by the incoming packet, then the write enable line (T16) for register file 202 is driven high and the RAM location containing the new packet becomes the head of a new queue for the requested port. The write enable line (T17) for register file 203 (which contains the RAM addresses of the tail elements of each queue) is driven high thus causing the value in register 206 to be written in here as well. This makes the address of the tail end of the queue for the requested port point to the new packet. T7 is driven high which causes the count, in block 200, of the number of elements in the queue for the requested port to increment. Step 6 is another null step. In step 7 multiplexers 219 & 220 are set by T11 & T10 respectively so that the value in register 211 (the number of the output port whose queue is currently the longest) is used to select the corresponding counter from block 200. T9 is driven high and the value of this counter is transferred into register 213 which holds the length of the longest queue and is thus brought up to date. In step 8 multiplexers 221 & 222 are set by T14 & T13 respectively to allow the value on the input line 'Pout' to load into register 206 as T15 goes high. This value was produced by the 'Pointer' RAM 103 read operation initiated in step 3 and is the RAM address of the location next in the 'Free List' after the old head. This now becomes the RAM address of the new head of the 'Free List'. T24 goes high causing the value on the input line 'Port' to be loaded into register 212 which selects which shift register in the parallel to serial converter 105 will receive the 'B' packet half being read out of the 'B' RAM 102. In step 9, providing the value in latch 215 is zero (which indicates that a queue already existed for the output port requested by the incoming 'A' packet half), then the write enable line (T25) for the 'Pointer' RAM 103 is driven high and the value in register 209 (the address in RAM of the new packet) is written in at the address held in register 210 (Which is the address for the old 'Tail' of the queue now containing the new packet). This action effectively 'links' the new 'A' packet half onto the end of it's queue. Multiplexer 219 is set by T11 to select the counter holding the number of elements in the new packer's queue from block 200. This value is compared with the value in register 213 (the length of the current longest queue) using comparator 218. If the output of the comparator is high then the length of the new packet's queue now exceeds that of the previous longest queue, T12 goes high and the value 'Req' is loaded into register 211 which holds the number of the port whose queue is longest and thus now points to the one requested by the new packet. If the output of register file 217 (which indicates whether or not there was an 'A' packet half queued and thus, written out, for the current output port in the previous phase of 'Wr A') is zero then T29 goes high and the 'B' packet half waiting at the input to the parallel to serial converter 105 is loaded into the output shift register selected in step 8, otherwise T28 goes high and this shift register is set to contain a null packet with a value of 1 in the 'No Traffic' bit of it's header field marking it as invalid. Finally, in step 10 (where the 'walking one' sequencer within the 'TIMING' block has a value of 000000001) T30 is driven high to increment the port counter 106 and thus select the shift register in the serial to parallel converter 100 that contains the next packet to be dealt with.

Case 2: Generating an 'A data' RAM write address and a 'B data' RAM read address with the memory full and a valid incoming packet.

As in the previous case the input from the packet header 'No Traffic', will be low, the value 'Port' will be the number of the output port currently awaiting a 'B' packet half and the value 'Req' will be the number of the output port, and hence the queue, into which the incoming 'A' packet half wishes to be delivered. However, the output of counter 201 will now be high indicating that there is no 'Free List' and, consequently, that the memory is full. The operation of the processor now proceeds as in Case 1 with the following differences. In step 1 multiplexers 219 & 220 are set by T11 & T10 respectively so that the value in register 211 is used to select the location in register file 202 containing the RAM address of the element at the head of the longest queue. Multiplexers 221 & 222 are set by T14 & T13 respectively and T15 is driven high so that this address is loaded into register 206 (which normally holds the RAM address of the element at the head of the 'Free List') The setting of multiplexers 219 & 220 also uses register 211 to select the counter in block 200 that holds the number of elements for the longest queue. T8 is driven high and the value in this counter is decremented. In step 3, when T5 is driven high, the value transferred from counter 201 into latch 216 will be a 1 indicating that there is no 'Free List'. The value that is transferred from register 206 into register 209 and thus becomes the write address for the 'A data' RAM 101 and the input to the 'Pointer' RAM 103 is now the address of the element at the head of the longest queue rather than the address of the element at the head of the 'Free List'. The selection of register 206 as the read address for the 'Pointer' RAM causes the address of the location next in the longest queue after it's head to become available on the input line 'Pout'. In step 4, when the 'A data' RAM write enable line T27 is driven high, the incoming 'A' packet half overwrites the 'A; packet half stored at the head of the longest queue. T4 remains low and the value in counter 201 (the number of elements in the 'Free List' i.e. zero) is not decremented. In step 7 multiplexers 219 & 220 are set by T11 & T10 respectively so that the value in register 211 is used to select the location in register file 202 containing the RAM address of the element at the head of the longest queue. T16 is driven high with multiplexer 223 set by T11 such that this location is overwritten by 'Pout', the output of the 'Pointer RAM 103. The effect of this is to make the address of the head of the longest queue point to the RAM location next in that queue after the previous 'head' location (which has just been overwritten by the incoming packet). In step 8 the register 206 (which holds the RAM address of the location at the head of the 'Free List') is still loaded from 'Pout' as in Case 1 but, because there is no 'Free List', this action is now irrelevant. Case 3: Generating a 'B data' RAM write address and an 'A data' RAM read address with a valid incoming packet.

The input from the packet header, 'No Traffic, will be low, the value 'Port' will now be the number of the output port awaiting an 'A' packet half and the value 'Req' is unused. In step 1 multiplexers 219 & 220 are set by T11 & T10 respectively so that the value 'Port' is used as a read address for register file 202, which selects the address of the element at the head of the queue for the current output port. T19 is driven high and this address is loaded into register 208 which provides the read address for the 'A data' RAM 101. The setting of multiplexers 219 & 220 also results in the value 'Port' selecting the counter from block 200 that holds the size of the queue for the current output port. T1 is driven high and the flag indicating whether or not this counter value is zero loaded into latch 214. The 'B data' RAM write enable line T26 is driven high and the incoming 'B' packet half is written in to the 'B' RAM 102 at the address given by register file 205. This will be the same address that was used in the previous phase of 'Wr A' when writing the corresponding 'A packet half into the 'A' RAM 101. Step 2 is a null step. In step 3 T22 goes high which causes the value in register 208 to be written into register file 204 at the location selected by 'Port'. This is done because it is the read address for the 'A data RAM and must be preserved so it can be re-used when dealing with the 'B' half of the outgoing packet in the next phase of 'Wr A'. Multiplexer 224 is set by T13 to select the output of register 208 (which holds the RAM address of the head of the queue for the current output port) as the read address for the 'Pointer' RAM. This action causes the address of the location next in the outgoing packets queue to become available on the input line 'Pout'. T21 is driven high and the value in register 208 is loaded into register 209 which, in turn, provides the input to the 'Pointer' RAM 103. T5 is driven high which causes the output of counter 201 to be loaded into latch 216. T20 is driven high and multiplexer 225 is set by T13 so that the value in register 207 (the RAM address of the tail of the 'Free List') is loaded into register 210 which in turn drives the write address for the 'Pointer' RAM 103. A read operation commences o the 'A data' RAM 101 which causes the 'A' packet half at the RAM address held in register 208 to transfer to the input of the parallel to serial converter 105. Multiplexers 219 & 220 are set by T11 & T10 respectively so that the value 'Port' selects the counter from block 200 corresponding to the current output port. If the output of latch 214 is zero (which implies that at least one packet is queued for the current output port and has therefore been read out) then T8 is driven high and this counter is decremented. T6 is driven high and the value in latch 214 is stored in register file 217 (addressed by the number of the current output port) so that it can be checked when dealing with the corresponding 'B' half of the outgoing packet. In step 4 nothing happens unless the output of latch 214 is zero. In this case T23 is driven high causing the value in register 208 to load into register 207, which holds the RAM address of the element at the tail end of the 'Free list' and now points to the location that is being vacated by the outgoing 'A' packet half. T3 is driven high which causes the counter holding the number of free RAM locations 201 to increment. If the output of latch 216 is high (which implies that there is no 'Free List' and, consequently, that the location being vacated is the only free location in memory) then T15 is driven high with multiplexer 222 set by T13 such that the value in register 208 is loaded into register 206. This holds the RAM address of the element at the head of the 'Free List' and thus now also points to the location being vacated by the outgoing 'A' packet half. In step 5 multiplexers 219 & 220 are set by T11 & T10 respectively so that the value in register 211 (the number of the output port whose queue is currently the longest) is used to select the corresponding counter from block 200. T9 is driven high and the value of this counter is transferred into register 213 which holds the length of the longest queue and is thus brought up to date. Step 6 is a null step. In step 7, if the output of latch 214 is zero (implying that a packet was queued for the current output port and has therefore been read out) then multiplexers 219 & 220 are set such that the value 'Port' is used to select the location in register file 202 containing the RAM address of the head of the queue for the current output port. Then (again providing latch 214 is zero) multiplexer 223 is set by T11 and T16 is driven high causing the selected location to be overwritten by 'Pout', the output of the 'Pointer' RAM 103. The effect of this is to make the address of the head of the queue for the current output port point to the RAM location next in that queue after the previous 'head' location (which has just been read out). In step 8 T24 is driven high causing the value on the input line 'Port' to be loaded into register 212 which selects which shift register in the parallel to serial converter 105 will receive the 'A' packet half being read out of the 'A' RAM 101. In step 9, if the output of latch 216 is zero (which implies that there was at least one free location in memory before the current 'A' packet half was read out) then T25, the write enable line for the 'Pointer' RAM 103 is driven high. The write address, held in register 210, points to the tail element of the current 'Free List' and the input, held in register 209 is the address of the 'A data' RAM location that has just been vacated. Thus, the vacated location is 'linked' onto the end of the 'Free List'. In step 10, if the output of the latch 214 is zero (which indicates that there was a packet queued, and thus read out, for the current output port) then T29 goes high and the 'A' packet half waiting at the input to the parallel to serial converter 105 is loaded into the output shift register selected in step 8, otherwise T28 goes high and this shift register is set to contain a null packet with a value of 1 in the 'No Traffic' bit of it's header field marking it as invalid.

Data sheet A

A description of the inputs, outputs & registers illustrated in FIG. 6

| | | |
|---|---|---|
| A_DrdAdd | : | 8 bit output bus that gives the read address for the A Data RAM (101). |
| A_Dwe | : | 1 bit output line that enables a write to the A Data RAM (101). |
| A_DwrAdd | : | 8 bit output bus that gives the write address for the A Data RAM (101). |
| B_DrdAdd | : | 8 bit output bus that gives the read address for the B Data RAM (102). |
| B_Dwe | : | 1 bit output line that enables a write to the B Data RAM (102). |
| B_DwrAdd | : | 8 bit output bus that gives the write address for the B Data RAM (102). |
| B_PortEmpty (217) | : | 16 × 1 bit flags that hold the value of 'PortEmpty' for each port so they can be re-used when accessing the B half of the Data ram. |
| B_RdReg (204) | : | 16 × 8 bit register file that holds the value of 'RdReg' for each port so they can be re-used when reading out the B half of the packet. |
| B_WrReg (205) | : | 16 × 8 bit register file that holds the Data RAM write address for each port so they can be re-used when writing in the B half of the packet. |
| Ctr (200) | : | 16 × 9 bit counters giving the number of packets currently in the queue for each port. A given counter can be selected for increment/decrement and/or read via a 4 bit address line. Both the value of that counter and a flag indicating if it is zero are output. |
| FlEmpty (216) | : | 1 bit flag that preserves the output from 'FlpCtr'. |
| FlpCtr (201) | : | 9 bit counter for the number of elements currently in the free list. The output is a flag indicating if the counter is zero. |
| FlpHead (206) | : | 8 bit register that holds the RAM address of the head of the free list. |
| FlpTail (207) | : | 8 bit register that holds the RAM address of the tail of the free list. |
| Head (202) | : | 16 × 8 bit register file holding, for each port, the RAM address of the head of that port's list. |
| Load | : | 1 bit output line which causes the output from the Data RAM to be stored in the selected output latch. |
| MaxCtr (213) | : | 9 bit register that holds the value of 'Ctr' for 'MaxPort'. |
| MaxPort (211) | : | 4 bit register which indicates which port has the longest list. |
| NewReg (209) | : | 8 bit register that holds both the write address for the A Data RAM and the input data for the Pointer RAM (103). |

-continued

Data sheet A

A description of the inputs, outputs & registers illustrated in FIG. 6

| | | |
|---|---|---|
| Next_Port | : | 1 bit output line which selects the next 'Port' |
| No_Traffic | : | 1 bit from an incoming packet's header field that indicates if that packet contains valid data. |
| Null | : | 1 bit output line which sets the No_Traffic bit in the header field of the selected output latch. |
| OP_Select | : | 4 bit output bus that selects an output latch for the 'Null' or 'Load' operations. |
| Pin | : | 8 bit input to the Pointer RAM (103). |
| Port | : | 4 bit input which selects the current input/output port. |
| Port2 (212) | : | 4 bit register that preserves the value of 'Port'. |
| PortEmpty (214) | : | 1 bit flag which is set if the 'Ctr' value for the current 'Port' is zero. |
| Pout | : | 8 bit output from the Pointer RAM (103). |
| PrdAdd | : | 8 bit output bus that holds the read address for the Pointer RAM (103). |
| Pwe | : | 1 bit output line that enables a write to the Pointer RAM (103). |
| PwrAdd (210) | : | 8 bit register and output bus that contains the write address for the Pointer RAM (103). |
| RdReg (208) | : | 8 bit register that holds the RAM address of the packet currently being read out. |
| Req | : | 4 bits of an incoming packet's header field that indicate the output port for which that packet is destined and, consequently, the list in which it should be stored. |
| ReqEmpty (215) | : | 1 bit flag which is set if the 'Ctr' value for port 'Req' is zero. |
| Tail (203) | : | 16 × 8 bit register file holding, for each port, the RAM address of the tail of that port's list. |
| Wr_A | : | 1 bit output line which determines whether the processor is writing to the A data RAM and reading from the B data RAM or writing to the B data RAM and reading from the A data RAM. |

Data sheet B

TIMING block outputs (see FIG. 6)

P0 . . . P9 correspond to the outputs of the 'walking one' sequencer
used to identify the 10 consecutive 6 ns clock periods 1) PortEmpty_W = not(Wr_A) AND (P0 OR P1)
2) ReqEmpty_W = Wr_A AND (P2 OR P3)
3) FlpCtr_Inc = not(Wr_A) AND (P3 OR P4) AND not(PortEmpty)
4) FlpCtr_Dec = Wr_A AND (P3 OR P4) AND not(No_Traffic)
   AND not(FlEmpty)
5) FlEmpty_W = P2
6) PortEmptyB_W = not(Wr_A) AND (P2 OR P3)
7) Ctr_inc = Wr_A AND (P4 OR P5) AND not(No_Traffic)
8) Ctr_Dec = (Wr_A AND (P0 OR P1) AND not(No_Traffic) AND
   (FlpCtr = 0)) OR (not(Wr_A) AND (P2 OR P3) AND not(PortEmpty))
9) MaxCtr_W = (Wr_A AND (P6 OR P7)) OR (not(Wr_A) AND (P4 OR P5))
10) Ctr_Mux = not(Wr_A) AND (P0 OR P1 OR P2 OR P3 OR P6 OR P7)
11) Head_Mux = not(Wr_A) OR P0 OR P1 OR P6 OR P7
12) MaxPort_W = Wr_A AND P8 AND (Ctr[ ] > MaxCtr)
13) Wr_A
14) FlpHead_Mux = P7
15) FlpHead_W = (Wr_A AND (((P0 OR P1) AND (FlpCtr = 0)) OR
    (P7 AND not(No_Traffic)))) OR (not(Wr_A) AND P3
    AND not(PortEmpty) AND FlEmpty)
16) Head_W = (Wr_A AND not(No_Traffic) AND (((P4 OR P5) AND
    Reqempty OR ((P6 OR P7) AND FlEmpty)))) OR (not(Wr_A) AND
    (P6 OR P7) AND not(PortEmpty))
17) Tail_W = Wr_A AND (P4 OR P5) AND not(No_Traffic)
18) WrRegB_W = Wr_A AND (P2 OR P3)
19) RdReg_W = not(Wr_A) AND (P0 OR P1)
20) PwrAdd_W = P2 OR (Wr_A AND P3)
21) NewReg_W = P2 OR (Wr_A AND P3)
22) RdRegB_W = not(Wr_A) AND (P2 OR P3)
23) FlpTail_W = not(Wr_A) AND P3 AND not(PortEmpty)
24) Port2_W = P7
25) Pwe = (P7 OR P8 OR P9) AND ((Wr_A AND not(ReqEmpty)) OR
    (not(Wr_A) AND FlEmpty))
26) B_Dwe = not(Wr_A) AND (P2 OR P3 OR P4 OR P5 OR P6 OR
    P7 OR P8 OR P9) AND not(No_Traffic)
27) A_Dwe = Wr_A AND (P3 OR P4 OR P5 OR P6 OR P7 OR
    P8 OR P9) AND not(No_Traffic)

-continued

Data sheet B

TIMING block outputs (see FIG. 6)

28) Null = (Wr_A AND P8 AND PortEmpty_B([]) OR (not(Wr_A) AND P9 AND PortEmpty)
29) Load = (Wr_A AND P8 AND not(PortEmpty_B([])) OR (not(Wr_A) AND P9 AND not(PortEmpty))
30) Next_Port = P9

Note:
Write enable lines are given as active high.

---

APPENDIX A-2

This sheet includes some brief comments about the numbered statements of the algorithm set forth on APPENDIX A-1

A data RAM write/B data RAM read ( Wr_A )

1) If the free list is empty (I.E. the queue is full) then prepare to overwrite the head of the longest list.
2) Initiate a B data RAM read from the same address as the previous A data RAM read for this port.
3) If the longest list is being overwritten than decrement the count for the appropriate channel.
4) Initiate a pointer RAM read to obtain either a) the next location in the free list of b) the next location in the longest list.
5) Make a copy of the address to be used when writing to the A data RAM so that is can be re-used when writing to the B data RAM.
6) Set a flag for the requested list being empty (necessary because this condition is tested in statement 19 and Ctr[Req] may be altered by statement 14).
7) Set a flag for the free list being empty (necessary because this condition is tested in statement 15 and FlpCtr may be modified by statement 11).
8) Latch the value to be used when writing to the pointer RAM (necessary because FlpHead may be modified by statement 17 and the write doesn't start until statement 19).
9) Latch the address to be used when writing to the pointer RAM (necessary because Tail[Req] may be modified by statement 13 and the write doesn't start until statement 19).
10) If there is a traffic then write the new packet's A half into the A data RAM. The write address will either be the head of the free list or, if this is empty, the head of the longest list.
11) If there is traffic and the free list is not already empty then decrement the free list count.
12) If there is no list for the requested channel then start a new one by making it's head point to the new packet.
13) If there is traffic then make the tail pointer for the requested channel point to the new packet . . .
14) . . . and increment the count for that channel.
15) If the longest list has been overwritten then move it's head pointer one place down the list.
16) keep the count for the longest list up to date.
17) If there is traffic then move the head of the free list one place down the list (if the free list is empty then this will be irrelevant).
18) Latch the value of the current port (for continuity with the A data RAM read cycle).
19) If a list exists for the requested channel then link the new packet onto the end of it.
20) If the list for the requested channel is now longer than the longest list then make this the new longest list.
21) If there was valid data in the B RAM location read at statement 2 then load the output of the B data RAM into the output register . . .
22) . . . otherwise set the No_Traffic bit in the header field of the output register.
23) Move on to the next port.

APPENDIX A-2-continued

This sheet includes some brief comments about the numbered statements of the algorithm set forth on APPENDIX A-1

A data RAM read/B data RAM write ( not(Wr_A))

1) Prepare to read out the head of the list for this port.
2) Set a flag for this port's list being empty (necessary because this condition is tested in statements 12,13,14,16,19 & 20 and Ctr[Port] may be modified by statement 10).
3) If there is traffic (B half) then initiate a B data RAM write into the same address as the previous A data RAM write for this port.
4) Make a copy of the address to be used when reading from the A data RAM so that it can be re-used when reading from the B data RAM.
5) Latch the value to be used when writing to the pointer RAM (necessary because RdReg will be modified by the next statement 1, before the write has completed).
6) Set a flag for the free list being empty (necessary because this condition is tested by statement 18 and FlpCtr may be modified by statement 14).
7) Latch the address to be used when writing to the pointer RAM (necessary because FlpTail may be modified by statement 13 and the write doesn't start until statement 18).
8) Initiate the read from the A data RAM.
9) Initiate a pointer RAM read to obtain the next item in the list for this port.
10) If there is data being read out for this port then decrement the appropriate count.
11) Store the flag which determines wether or not valid data is being read out of the A ram so that it can be re-used for the corresponding B ram read.
12) If a location has just been vacated and there is no free list then start a new one by making it's head point to that location.
13) If a location has just been vacated then make it the tail of the free list . . .
14) . . . and increment the free list counter.
15) Keep the count for the longest list up to date.
16) If a valid packet has just been read out then move the head pointer for it's list down one place.
17) Latch the value of the current port (necessary because it will be incremented at the same time as it is being used to load the appropriate output register - statements 19,20 & 21).
18) If there is a free list then link the newly vacated location onto the end of it.
19) If the A data RAM read has produced valid data (I.E. the list for this port wasn't empty) then load it into the output register . . .
20) . . . otherwise set the No_Traffic bit in the header of the output register.
21) Move on to the next port.

APPENDIX A-1

This is the algorithm implemented by the queue processor shown in FIGS. 6A, 6B, 6C. It has been split into the two separate phases of 'Wr_A' so that, in the first phase, when 'Wr_A' is high, the algorithm produces a write address for the 'A data RAM and a read address for the 'B data RAM and in the second phase, when 'Wr_A' is low, it produces a read address for the 'A data RAM and a write address for the 'B data RAM. Each phase is subdivided into 10 separate steps lasting 6ns each such that all the statements in a given step can be carried out simultaneously.

```
if Wr_13_A then                                             else
begin                                                       begin
(*——————————————————— 0ns —*)                              (*——————————————————— 0ns —*)
 1) if (FlpCtr = 0) then FlpHead := Head[MaxPort];           1) RdReg := Head[Port];
 2) drd_b(RdReg_B[Port_B]);                                  2) PortEmpty := (Ctr[Port] = 0);
 3) if not(No_Traffic) and (FlpCtr = 0) then dec(Ctr[MaxPort]); 3) if not(No_Traffic) then dwr_b(WrReg_B[Port]);
(*——————————————————— 6ns —*)                              (*——————————————————— 6ns —*)
(*——————————————————— 12ns —*)                             (*——————————————————— 12ns —*)
 4) prd(FlpHead);                                            4) RdReg_B[Port] := RdReg;
 5) WrReg_B[Port] := FlpHead;                                5) NewReg := RdReg;
 6) ReqEmpty := (Ctr[Req] = 0);                              6) FlEmpty := (FlpCtr = 0);
 7) FlEmpty := (FlpCtr = 0);                                 7) PwrAdd := FlpTail;
 8) NewReg := FlpHead;                                       8) drd_a(RdReg);
 9) PwrAdd := Tail[Req];                                     9) prd(RdReg);
                                                            10) if not(PortEmpty) then dec(Ctr[Port]);
                                                            11) PortEmpty_B[Port] := PortEmpty;
(*——————————————————— 18ns —*)                             (*——————————————————— 18ns —*)
10) if not(No_Traffic) then dwr_a(NewReg);                  12) if not(PortEmpty) and FlEmpty then FlpHead := RdReg;
11) if not(No_Traffic) and not(FlEmpty) then dec(FlpCtr);       if not(PortEmpty) then
                                                                begin
                                                            13)     FlpTail := RdReg;
                                                            14)     inc(FlpCtr)
                                                                end
(*——————————————————— 24ns —*)                             (*——————————————————— 24ns —*)
12) if not(No_Traffic) and ReqEmpty then Head[Req] := FlpHead; 15) MaxCtr := Ctr[MaxPort];
    if not(No_Traffic) then
    begin
13)    Tail[Req] := FlpHead;
14)    inc(Ctr[Req])
    end;
(*——————————————————— 30ns —*)                             (*——————————————————— 30ns —*)
(*——————————————————— 36ns —*)                             (*——————————————————— 36ns —*)
15) if not(No_Traffic) and FlEmpty then Head[MaxPort] := Pout; 16) if not(PortEmpty) then Head[Port] := Pout;
16) MaxCtr := Ctr[MaxPort];
(*——————————————————— 42ns —*)                             (*——————————————————— 42ns —*)
17) if not(No_Traffic) then FlpHead := Pout;                17) Port2 := Port;
18) Port2 := Port;
(*——————————————————— 48ns —*)                             (*——————————————————— 48ns —*)
19) if not(ReqEmpty) then pwr(PwrAdd, NewReg);              18) if not(FlEmpty) then pwr(PwrAdd, NewReg);
20) if (Ctr[Req] > MaxCtr) then MaxPort := Req;
    if not(PortEmpty_B[Port]) then
21)    load(Port2)
    else
22)    null(Port2);
(*——————————————————— 54ns —*)                             (*——————————————————— 54ns —*)
23) inc(Port);                                                  if not(PortEmpty) then
                                                            19)    load(Port2)
                                                                else
                                                            20)    null(Port2);
                                                            21) inc(Port);
(*——————————————————— 60ns —*)                             (*——————————————————— 60ns —*)
end                                                         end
```

I claim:

1. An asynchronous time division multiplex switching system comprising a serial to parallel converter arranged to receive incoming packets of data which include routing information in serial form and convert them into parallel form, a memory in which each incoming packet of data is entered in an addressed location thereof, a processor to arrange said incoming packets of data in queues, one for each output port, and a parallel to serial converter arranged to receive packets of data from said queues of data in parallel form and convert them into serial form for delivery to output ports corresponding to each queue, said processor being arranged to maintain a record of the number of packets in each of said queues so that when the memory is full, a packet at the head of the longest queue, that is the oldest packet in the longest queue, is discarded to make room for a newer, incoming packet of data.

2. A system as claimed in claim 1, in which the serial to parallel converter is split into two blocks and each packet of data is split into two halves and read into a respective block of the serial to parallel converter.

3. A system as claimed in claim 2, in which the memory is split into two halves, each of which is arranged to be accessed independently and is arranged to store the respective half of the packet of data from the respective block of the serial to parallel converter.

4. A system as claimed in claim 3, in which the parallel to serial converter is split into two blocks, each arranged to receive the respective half of the packet of data from the memory for delivery to an output port.

5. A system as claimed in claim 1 in which each incoming packet of data is a broadband block of data.

6. A system as claimed in claim 1 which is embodied in an integrated silicon chip.

7. A method of routing data in an asynchronous time division multiplex switching system, which comprises the steps of: converting incoming packets of data which include routing information from serial form to parallel form, entering each packet of incoming data in an addressed location of a memory, arranging said incoming packets of data in queues, one for each output port, converting said packets of data from parallel form to serial form for delivery to output ports corresponding to each queue, maintaining a record of the number of packets of data in each of said queues, and discarding a packet of data at the head of the longest queue, that is the oldest packet in the longest queue, to make room for a newer, incoming packet of data, when the memory is full.

* * * * *